(12) United States Patent
Dinh et al.

(10) Patent No.: US 7,756,553 B2
(45) Date of Patent: Jul. 13, 2010

(54) FOLDED FLEX ASSEMBLY FOR PERSONAL MEDIA DEVICE

(75) Inventors: Richard Hung Minh Dinh, San Jose, CA (US); Tang Yew Tan, San Francisco, CA (US); Erik L. Wang, Redwood City, CA (US); Philip Michael Hobson, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 11/650,923

(22) Filed: Jan. 5, 2007

(65) Prior Publication Data

US 2008/0167094 A1    Jul. 10, 2008

(51) Int. Cl.
*H04M 1/00* (2006.01)
(52) U.S. Cl. .................. 455/575.1; 455/550.1
(58) Field of Classification Search .............. 455/550.1, 455/575.1–575.9, 344–350; D14/138; 361/679.27, 361/679.28, 679.33; 345/158, 169
See application file for complete search history.

(56) References Cited

U.S. PATENT DOCUMENTS

| | | | |
|---|---|---|---|
| 3,819,879 A | 6/1974 | Baechtold | |
| 4,336,861 A | 6/1982 | Peter | |
| 5,012,890 A | 5/1991 | Nagi et al. | |
| 5,092,424 A | 3/1992 | Schreiber et al. | |
| 5,175,878 A * | 12/1992 | Davis et al. | 455/103 |
| 5,260,681 A | 11/1993 | Asai et al. | |
| 5,261,006 A | 11/1993 | Nieuwendijk et al. | |
| 5,471,019 A | 11/1995 | Maire | |
| 5,479,520 A | 12/1995 | Nieuwendijk et al. | |
| 5,642,404 A | 6/1997 | Hsu | |
| 5,790,679 A | 8/1998 | Hawker et al. | |
| 6,058,293 A | 5/2000 | Phillips | |
| 6,389,146 B1 | 5/2002 | Croft, III | |
| 6,473,625 B1 | 10/2002 | Williams et al. | |
| 6,687,515 B1 * | 2/2004 | Kosaka | 455/566 |
| 6,728,386 B1 | 4/2004 | Andersen | |
| 6,758,303 B2 | 7/2004 | Zurek et al. | |
| 6,868,602 B2 | 3/2005 | McCullough | |
| 6,965,790 B1 | 11/2005 | Mendolia | |
| 6,980,777 B2 * | 12/2005 | Shepherd et al. | 455/90.3 |
| 7,069,061 B2 | 6/2006 | Gammon et al. | |
| 7,130,420 B2 | 10/2006 | Windeballe et al. | |
| 7,336,980 B1 * | 2/2008 | Kaikuranta et al. | 455/575.6 |
| 2002/0085731 A1 | 7/2002 | Aylward | |
| 2004/0203494 A1 | 10/2004 | Eaton | |
| 2004/0224638 A1 | 11/2004 | Fadell et al. | |
| 2004/0240698 A1 | 12/2004 | Eaton | |
| 2005/0282594 A1 * | 12/2005 | Oldham | 455/575.3 |
| 2006/0128346 A1 * | 6/2006 | Yasui | 455/333 |
| 2006/0183505 A1 * | 8/2006 | Willrich | 455/566 |

FOREIGN PATENT DOCUMENTS

EP              0489551           6/1992
WO         WO 02/34006           4/2002

* cited by examiner

*Primary Examiner*—Kent Chang
*Assistant Examiner*—San Htun
(74) *Attorney, Agent, or Firm*—Kramer Levin Naftalis & Frankel LLP

(57) ABSTRACT

Systems and methods are provided for media devices including a housing, a frame disposed adjacent to the housing, a support panel that is integrated with the frame, and a flexible circuit that is disposed adjacent to the support panel such that the support panel provides support for the flexible circuit.

26 Claims, 17 Drawing Sheets

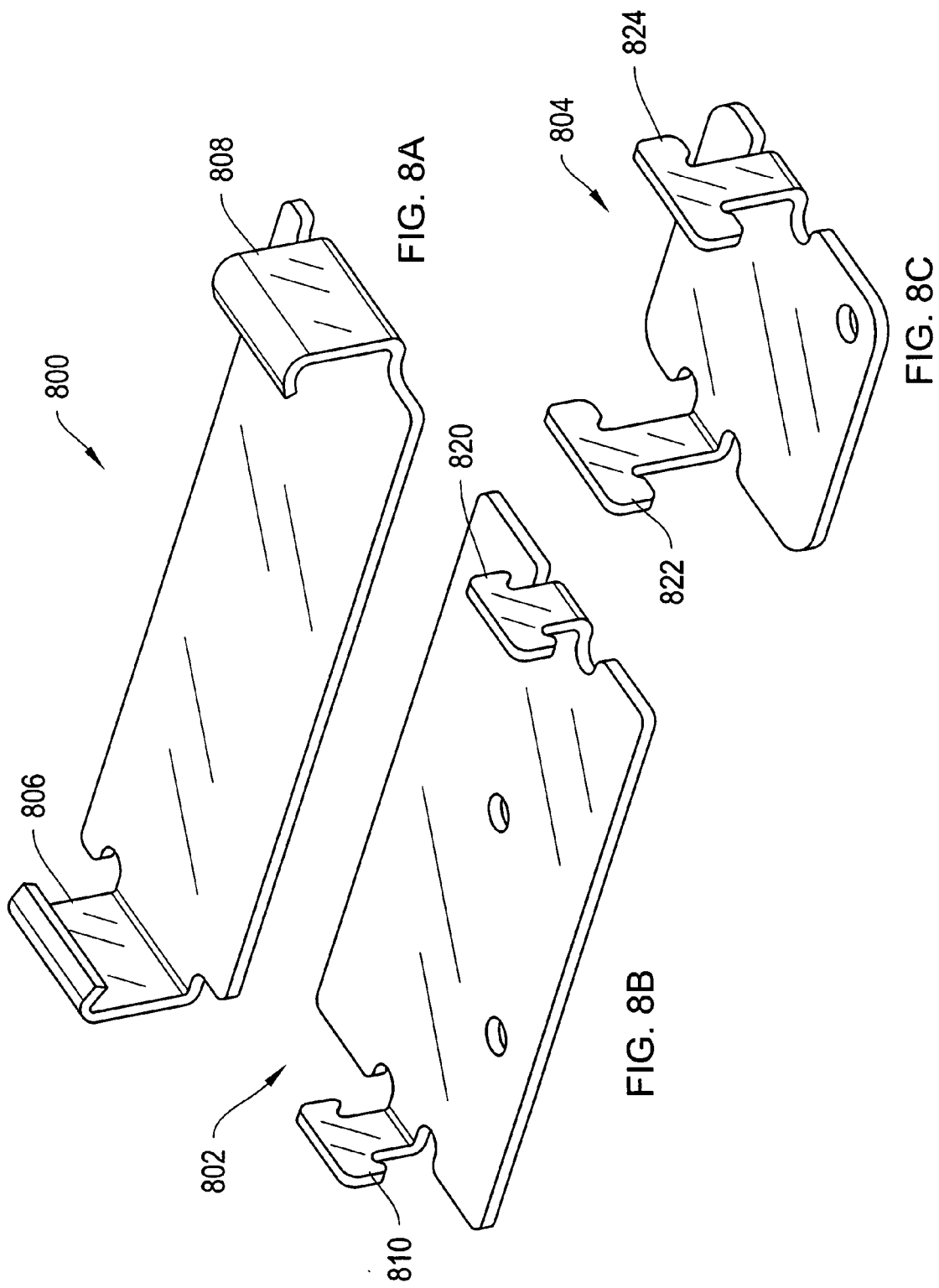

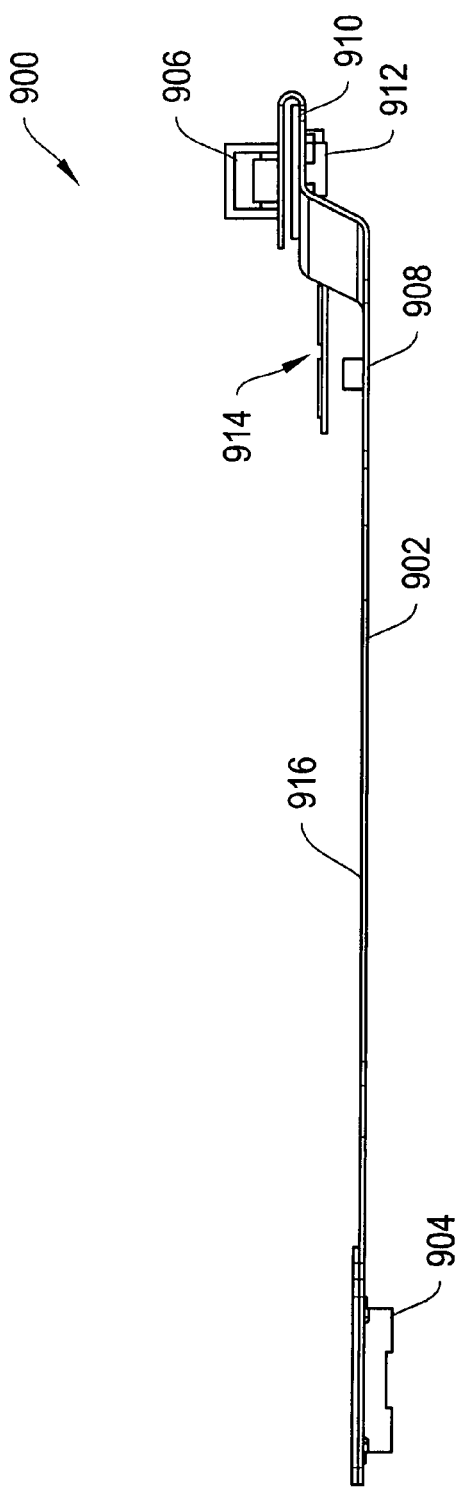
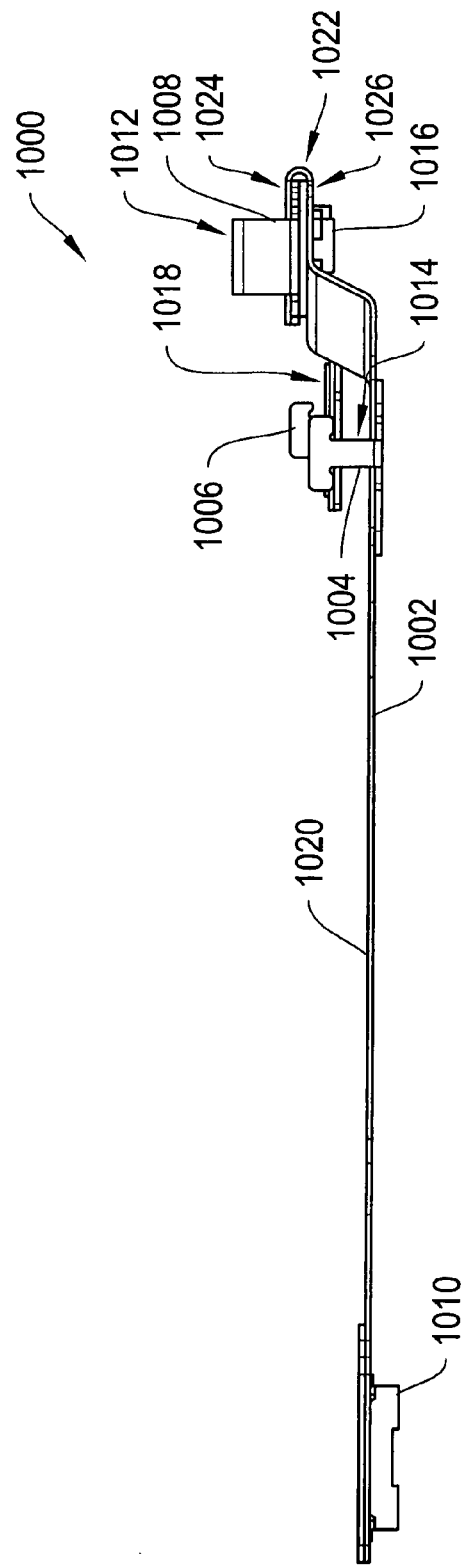

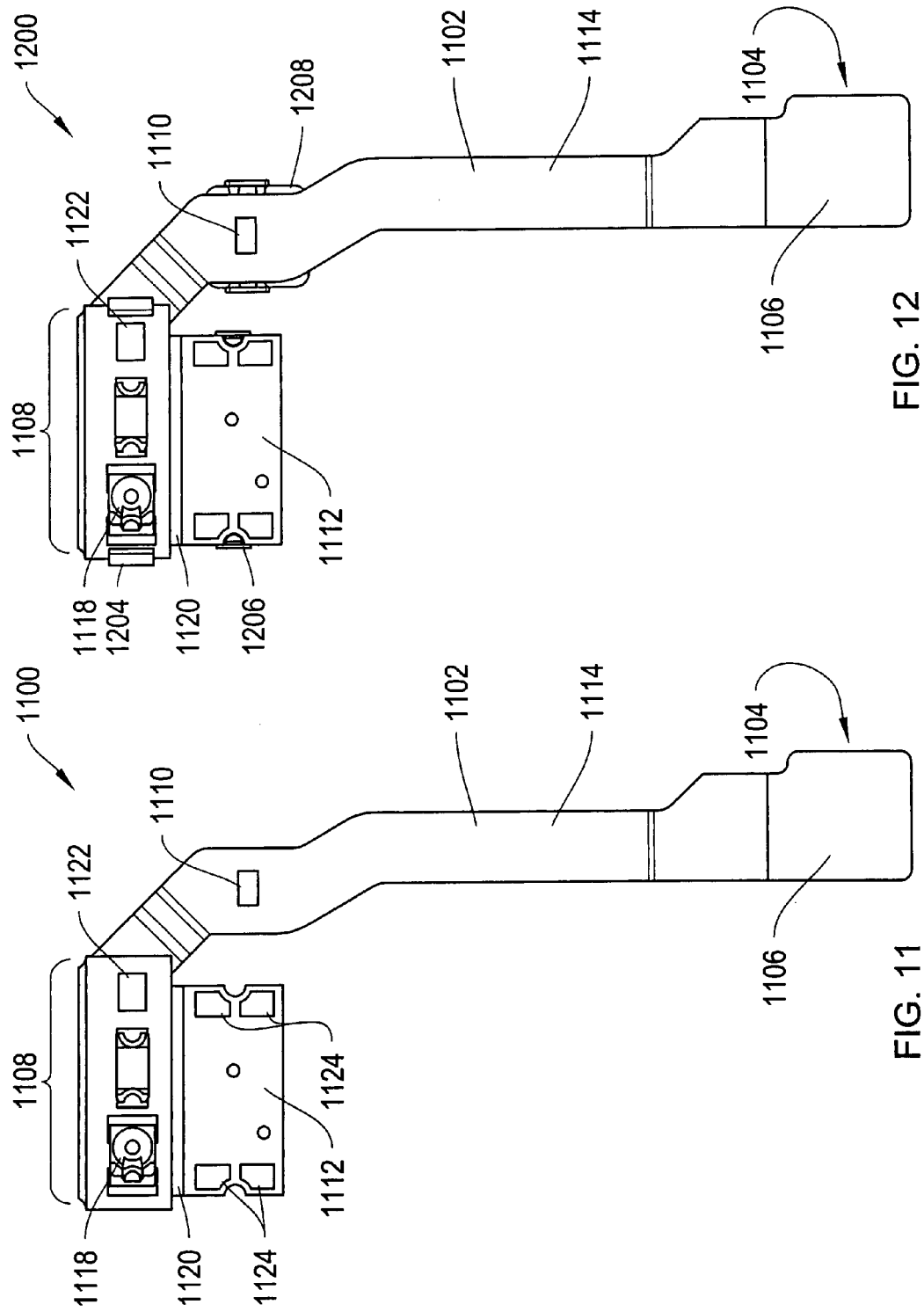

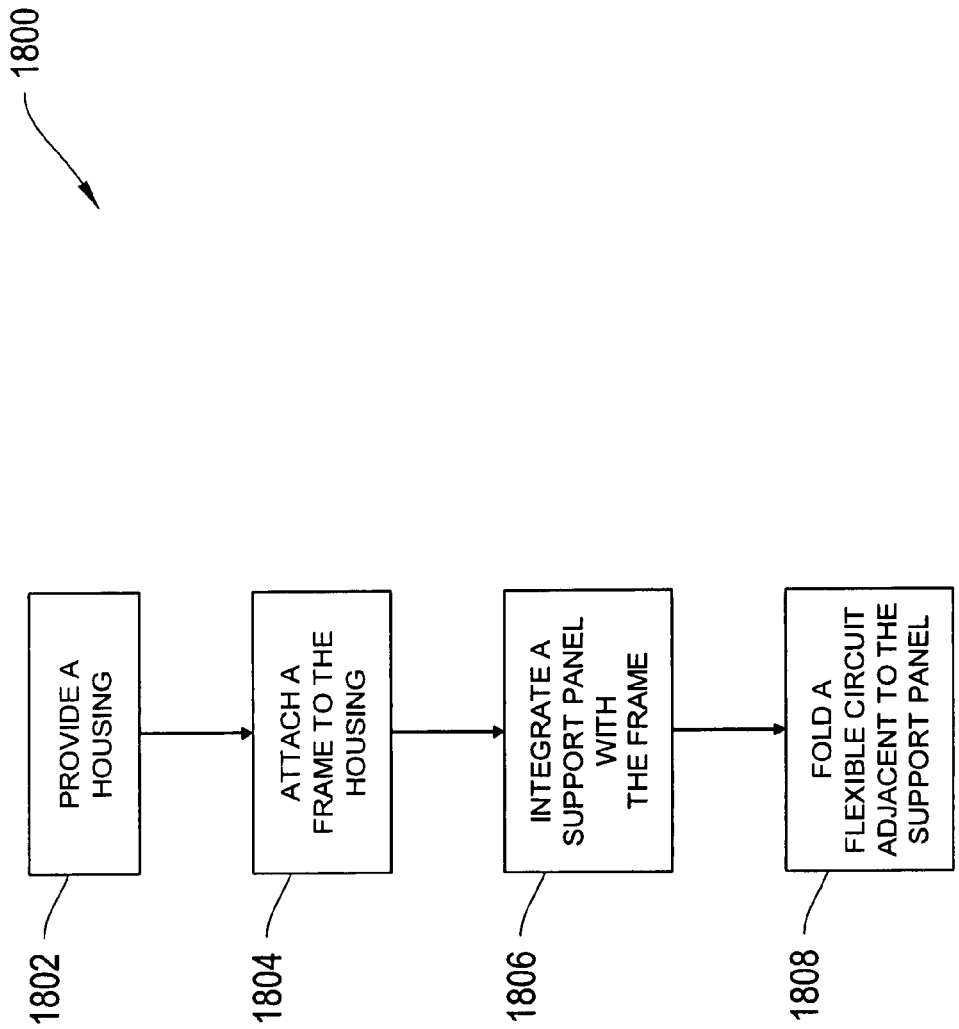

FOLDED FLEX ASSEMBLY FOR PERSONAL MEDIA DEVICE

BACKGROUND

This invention relates to personal media devices and, more particularly, to a folded flex assembly for personal media devices.

The proliferation of compact portable personal media devices (e.g., portable MP3 players, portable video players, and media capable cellular telephones) has created a need for even more compact and feature rich media devices.

One problem with existing media devices such as cellular telephones is that the media device has limited space available on it's internal circuit board or boards to support various media, communications, and other processing features that typical users now desire in a compact media device. Accordingly, there is a need for more efficiently arranging the various components within a media device to, for example, enable the inclusion of more components that support more service features.

Another problem with existing media devices is that the configuration or arrangement of various internal components is constrained by the size or position of the circuit board or boards, and their components, within the media device. The need to arrange a component or components at certain circuit board locations can effect the overall size, shape, or form-factor of a media device. Accordingly, there is a need for more flexible arrangement of internal components in a media device to enable more flexible design of the size, shape, or form-factor of a media device.

Another problem with existing media devices is that certain internal components are susceptible to physical stresses such as physical shock or vibrations that can degrade the performance of these components. Accordingly, there is a need to provide more structural rigidity for certain internal components to enhance performance and make the media device more robust and reliable in an environment subject to physical stresses.

SUMMARY

The invention, in various embodiments, addresses deficiencies in the prior art by providing systems, methods and devices that enhance the ability of a compact media device to support flexible arrangements of more components and, thereby, support more features while also providing enhanced structural support for certain components.

In various aspects, the invention employs an flexible circuit and/or flex assembly that is integrated with the frame. The flex assembly may include one or more components that would otherwise be mounted on the media device's circuit board. The component or components may include an acoustic source, proximity sensor, and/or light sensor. By including the components on the flexible circuit rather than the circuit board, space is made available on the circuit board for other components that may support other features. For example, by mounting an acoustic source on the flexible circuit, a SIMM tray or receptacle may be included on the media device's circuit board to enable SIMM card based services. The term "integrated with" may include integrally formed with, unitarily formed with, attached to, detachably connected to, mounted on, or any like permanent, semi-permanent, or temporary configuration whereby an element, or a portion thereof, is in physical communication or contact with another element of the media device. An acoustic source may include a speaker assembly or acoustic receiver which is not the same as a radio frequency (RF) receiver.

In one aspect, a media device includes a housing, a frame disposed adjacent to the housing, a support panel being integrated with the frame, and a flexible circuit disposed adjacent to the support panel to provide support for the flexible circuit. The frame may be disposed substantially within the housing. The frame may include a backplane. The flexible circuit may include a first portion adjacent to a first surface of the support panel. The flexible circuit may include a second portion adjacent to a second surface of the support panel. The flexible circuit may include a fold between the first and second portion for folding the first and second portion of the flexible circuit around a portion of the support panel. The flexible circuit may further include at least one of an acoustic source, a microphone, a proximity sensor, a light sensor, and a light source.

Another aspect includes a method for emitting a sound from a media device including: integrating a support panel with a frame of the media device, positioning a portion of a flexible circuit adjacent to the support panel, integrating an acoustic source with the flexible circuit, and emitting sound from the acoustic source to an external aperture of the media device.

A further aspect includes a method for manufacturing a media device including: providing a housing, attaching a frame to the housing, integrating a support panel with the frame, and positioning a portion of a flexible circuit adjacent to the support panel.

Various advantages and applications using a flex assembly integrated with a media device frame in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which:

FIGS. 8A-8C show a perspective views of support panels for a flexible circuit according to an illustrative embodiment of the invention.

FIG. 9 shows a transverse view of a flex assembly including a flexible circuit according to an illustrative embodiment of the invention;

FIG. 10 shows a transverse view of a flex assembly including a flexible circuit having support panels according to an illustrative embodiment of the invention;

FIG. 11 shows a top down view of a flex assembly including a flexible circuit according to an illustrative embodiment of the invention;

FIG. 12 shows a top down view of a flex assembly including a flexible circuit having support panels according to an illustrative embodiment of the invention;

FIG. 18 is a flow chart of a process for manufacturing a media device according to an illustrative embodiment of the invention.

DETAILED DESCRIPTION OF THE DISCLOSURE

Figure 1A:
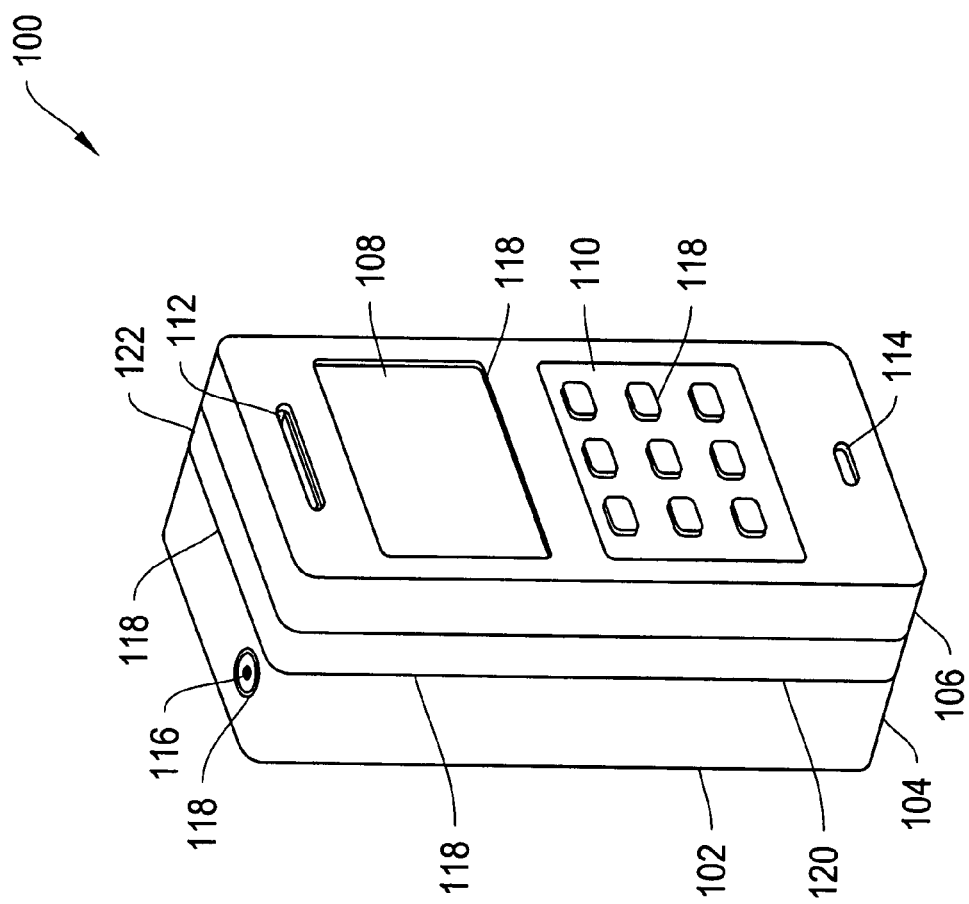
FIG. 1A is a perspective view of a media device with an exposed frame assembly according to an illustrative embodiment of the invention.

FIG. 1A is a perspective view of a media device 100 according to an illustrative embodiment of the invention. The media device 100 includes a housing 102, a first housing portion 104, a second housing portion 106, a display 108, a keypad 110, a speaker housing aperture 112, a microphone housing aperture 114, a headphone jack 116, and frame sidewall 122. Although not shown, in certain embodiments, the frame sidewall 122 is the exposed portion of a frame residing within or adjacent to the housing 102 that provides structural support for the media device 100 and various internal components. The housing 102 also includes various gaps 118 that may include openings, separations, vents, or other pathways between elements of the housing 102 that enable the passage of air or sound through the housing 102.

In one embodiment, the housing 102 includes a first housing portion 104 and a second housing portion 106 that are fastened together to encase various components of the media device 100. In certain embodiments, the housing 102 also includes an exposed frame 120 that provides structural support for the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and other components. Further details regarding certain internal components are discussed later with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may including one or more housing apertures 114 to facilitate the reception of sounds, such as voice, for an internal microphone from a media device user.

In certain embodiments, the housing 102 includes one or more gaps 118 associated with the housing 102. These gaps 118 may result from the manufacturing and/or assembly process for the media device 100. For example, in certain circumstances, the mechanical attachment of the first housing portion 104 with the second housing portion 106 or the sidewall 122 results in a crease 120 or joint between the portions 104 and 106. In certain media devices 100, the crease 120 is not air tight, resulting in gaps 118 along the crease. Other gaps may be formed during assembly between, for example, one or more keys of the keypad 110 and the housing 102 or the display 108 and the housing 102, resulting in additional gaps 118. In other embodiments, the housing 102 may include addition portions that are integrated to form the housing 102 for the media device 100.

The media device 100 may include a wireless communications device such as a cellular telephone, satellite telephone, cordless telephone, personal digital assistant (PDA), pager, portable computer, or any other device capable of wireless communications. In fact, FIG. 1 shows an exemplary cellular telephone version of a broad category of media device 100.

The media device 100 may also be integrated within the packaging of other devices or structures such a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the media device 100 with short-range communicating functionality. Alternative types of media devices 100 may include, for example, a media player such as an ipod available by Apple Computer Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the media device 100 may synchronize with, for example, a remote computing system or server to receive media (using either wireless or wireline communications paths). Wireless syncing enables the media device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the media device 100. In certain embodiments, media and/or data is "downloaded" to the media device 100. In other embodiments, the media device 100 is capable of uploading media to a remote host or other client system. Further details regarding the capabilities of certain embodiments of the media device 100 are provided in U.S. patent application Ser. No. 10/423,490, filed on Apr. 25, 2003, the entire contents of which are incorporated herein by reference.

Figure 1B:
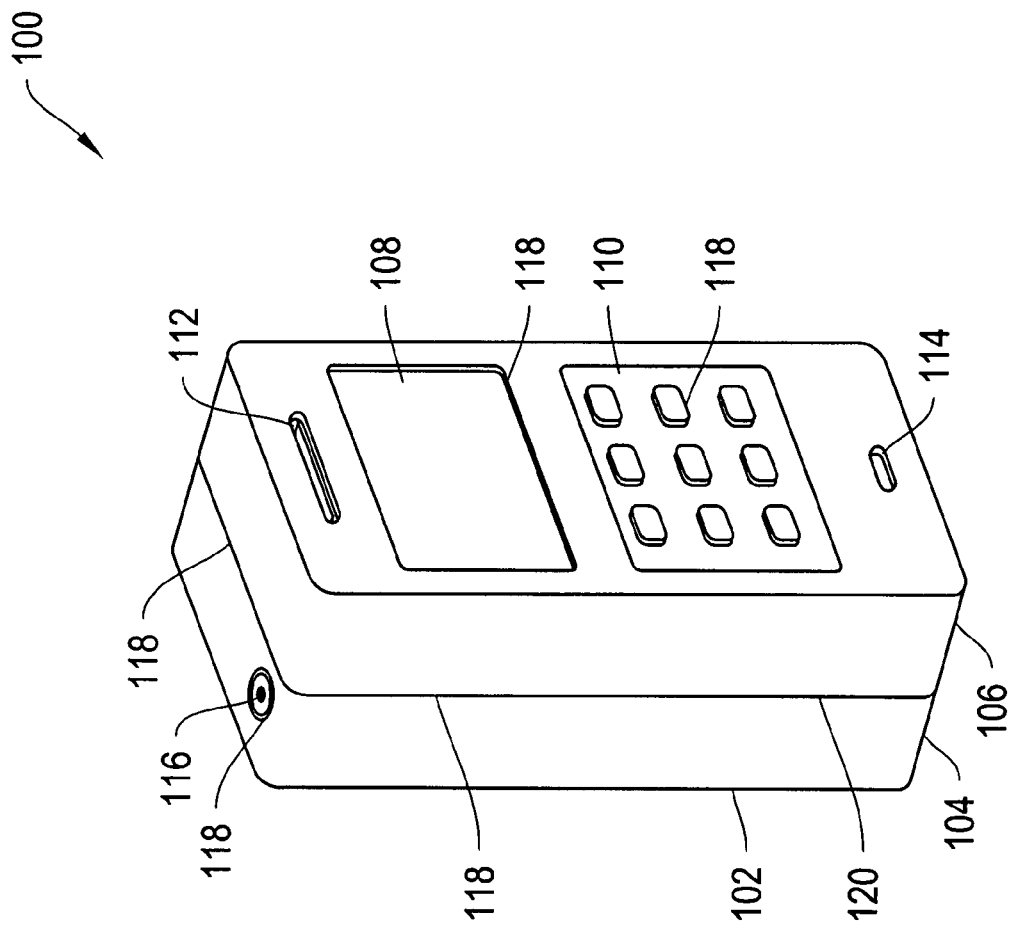
FIG. 1B is another perspective view of a media device according to an illustrative embodiment of the invention.

FIG. 1B is another perspective view of a media device 100 according to an illustrative embodiment of the invention. In this embodiment, as opposed to the embodiment of FIG. 1A, the media device's frame and/or the frame's sidewalls are not exposed to an external surface of the device. However, in certain embodiments, the frame is connected internally with at least a portion of one of the first housing portion 104 or the second housing portion 106.

Figure 2:
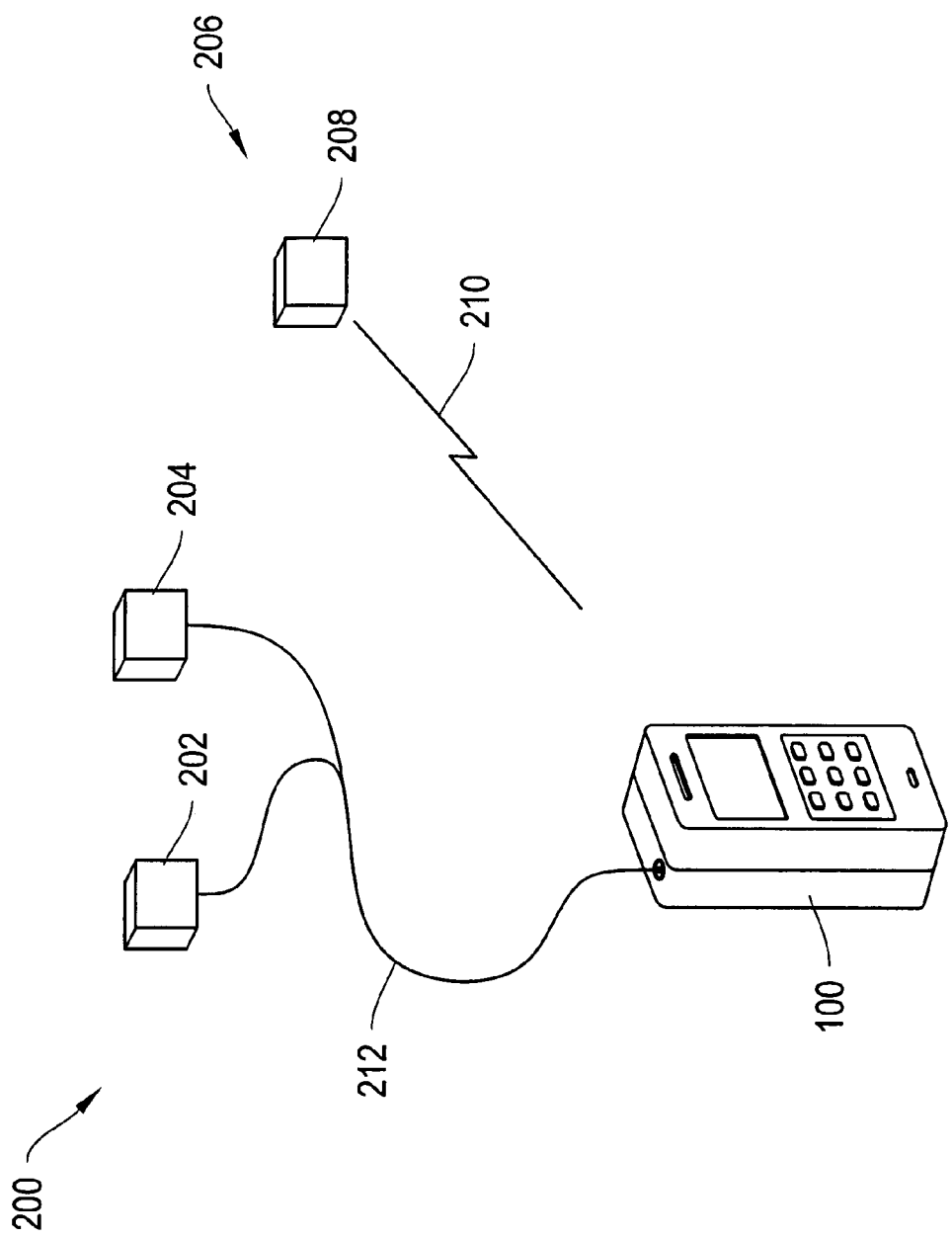
FIG. 2 shows the media device of FIGS. 1A and 1B with tethered headphones and, alternatively, a wireless earpiece according to an illustrative embodiment of the invention.

FIG. 2 shows the media device 100 of FIG. 1 with tethered headphones 200 and, alternatively, a wireless earpiece 206 according to an illustrative embodiment of the invention. The tethered headphones 200 include a cable 212 that connects to the media device 100 via external jack 116. In one embodiment, the cable provides for transport of an audio signal from the media device 100 to the headphones 100. In another embodiment, the headphones 200 includes a left housing 202 and a right housing 204, corresponding to the left and right ears of a user, respectively. Each housing 202 and 204 may include a speaker and/or an acoustic assembly as described later with respect to FIG. 4. The headphones 200 may optionally include a microphone to facilitate sending sounds from the user to the media device 100. As an alternative to the headphones 200, a user may utilize the wireless earpiece 206 which includes a housing 208. In one embodiment, the earpiece 206 employs wireless channel 210 to receive audio signals from the device 100 or transmit audio signals to the device 100. The housing 208 may include a speaker, microphone, and/or acoustic assembly as described later with respect to FIG. 4.

Figure 3:
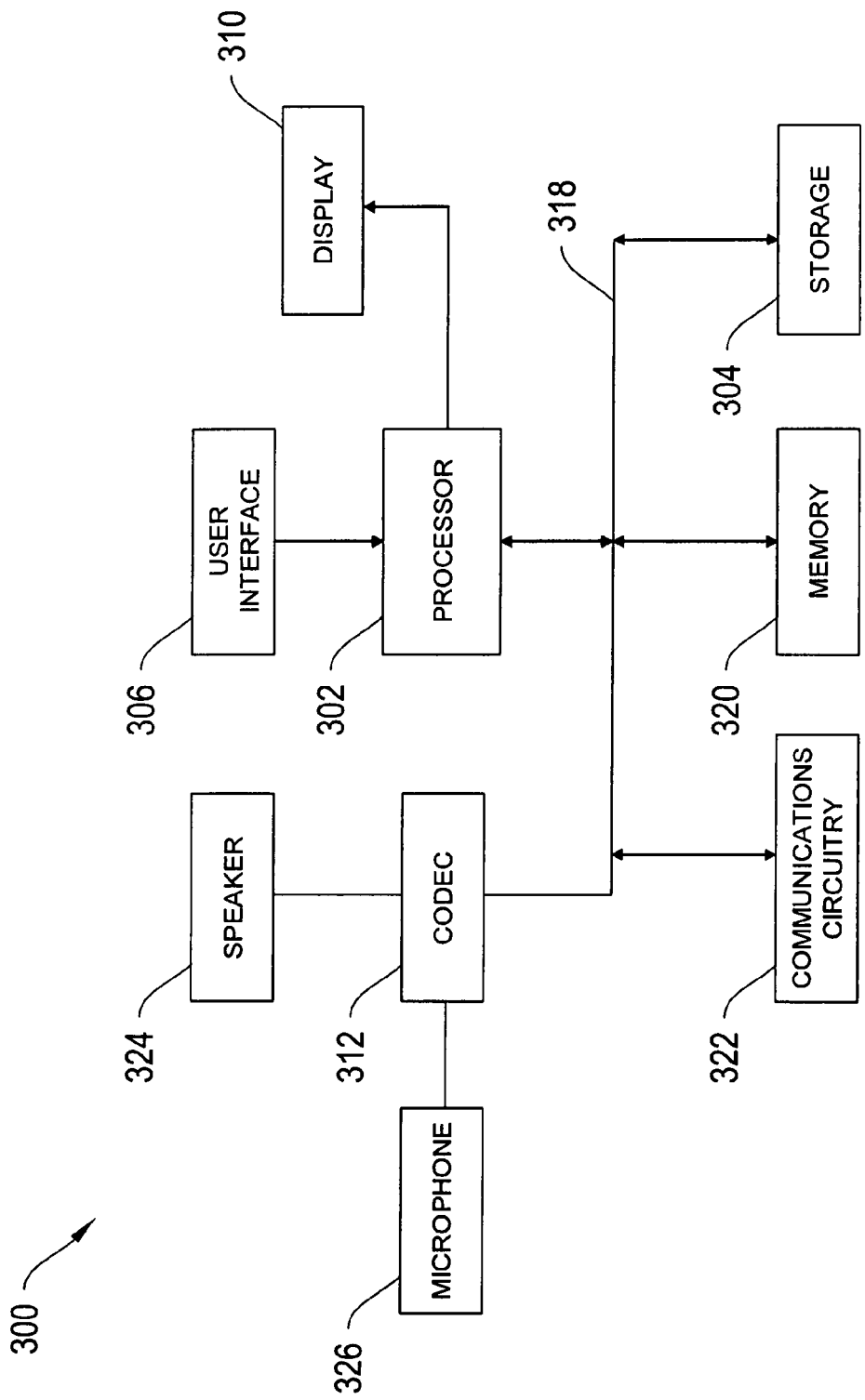
FIG. 3 shows a simplified functional block diagram of a media device according to an illustrative embodiment of the invention.

FIG. 3 shows a simplified functional block diagram of the media device 100 according to an illustrative embodiment of the invention. The media device or player 300 may include a processor 302, storage device 304, user interface 308, display 310, CODEC 312, bus 318, memory 320, communications circuitry 322, a speaker or transducer 324, and a microphone 326. Processor 302 may control the operation of many functions and other circuitry included in media player 300. Processor 302 may drive display 310 and may receive user inputs from user interface 308.

Storage device 304 may store media (e.g., music and video files), software (e.g., for implanting functions on device 300, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 112 may be included to convert digital audio signals into an analog signal for driving the speaker 324 to produce sound including voice, music, and other like audio. The CODEC 112 may also convert audio inputs from the microphone 326 into digital audio signals.

User interface 308 may allow a user to interact with the media device 300. For example, the user input device 308 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), and code divisional multiple access (CDMA) based wireless protocols. Communications circuitry 322 may also include circuitry that enables device 300 to be electrically coupled to another device (e.g., a computer or an accessory device) and communicate with that other device.

In one embodiment, the media device 300 may be a portable computing device dedicated to processing media such as audio and video. For example, media device 300 may be a media player (e.g., MP3 player), a game player, a remote controller, a portable communication device, a remote ordering interface, an audio tour player, or other suitable personal device. The media device 300 may be battery-operated and highly portable so as to allow a user to listen to music, play games or video, record video or take pictures, communicate with others, and/or control other devices. In addition, the media device 300 may be sized such that it fits relatively easily into a pocket or hand of the user. By being handheld, the media device 300 (or media device 100 shown in FIG. 1) is relatively small and easily handled and utilized by its user and thus may be taken practically anywhere the user travels.

As discussed previously, the relatively small form factor of certain prior art media devices has constrained the ability of these media devices to protect certain acoustic components such as speaker or microphone assemblies from damaging physical forces. Also, the quality of sound emitted from an acoustic source or received by an acoustic receptor has been adversely effected by the supporting structure or structures for these acoustic components. For example, a speaker that is mounted on a circuit board may be susceptible to vibrations that are propagated along the circuit board structure which can introduce interference or noise into the speaker's sound output. Accordingly, embodiments of the invention provide for improved sound quality and enhanced structural support for acoustic components such as an acoustic source.

Figure 4:
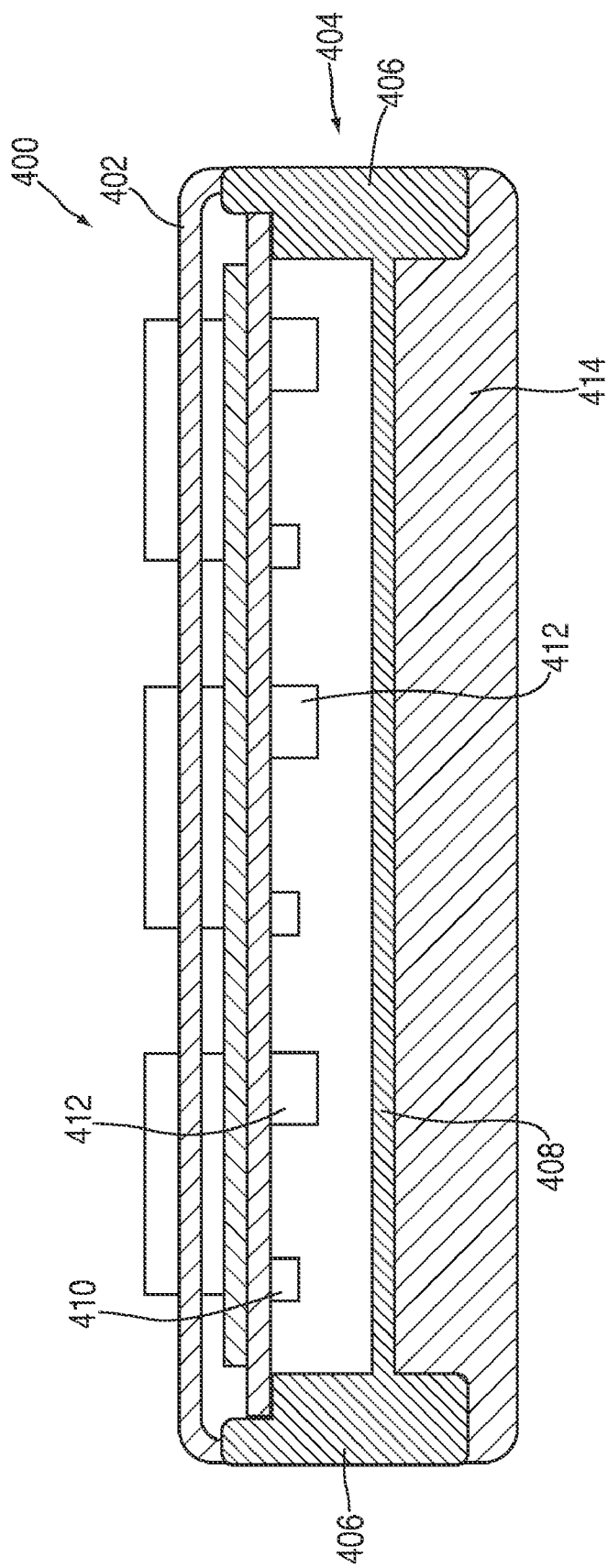
FIG. 4 shows a transverse sectional view of a conventional cellular telephone.

FIG. 4 shows a transverse sectional view of a conventional cellular telephone 400. The conventional cellular telephone 400 comprises an upper housing 402. The main structural frame 404 is secured to the housing 402 which may be fabricated from a die-castable material using a die-casting process. The frame 404 includes a surrounding sidewall 406 and a web or backplane 408. The web 408 extends between the sidewall 406 and forms a printed circuit board compartment between the housing 402 and web 408. The printed circuit board compartment is bounded on the top by the housing 402 and on the bottom by the web 408. The printed circuit board compartment includes a printed circuit board 410 and associated electrical components 412. The web 408 supports or houses a battery 414 which, in turn, forms the back of the cellular telephone 400. The conventional cellular telephone 400 employs a unitized frame member 404 which is composed of a single die-castable material, typically magnesium or zinc, where the sidewall 406 and the web 408 are constructed of the same or different material via a die-cast fabrication technique.

Figure 5:
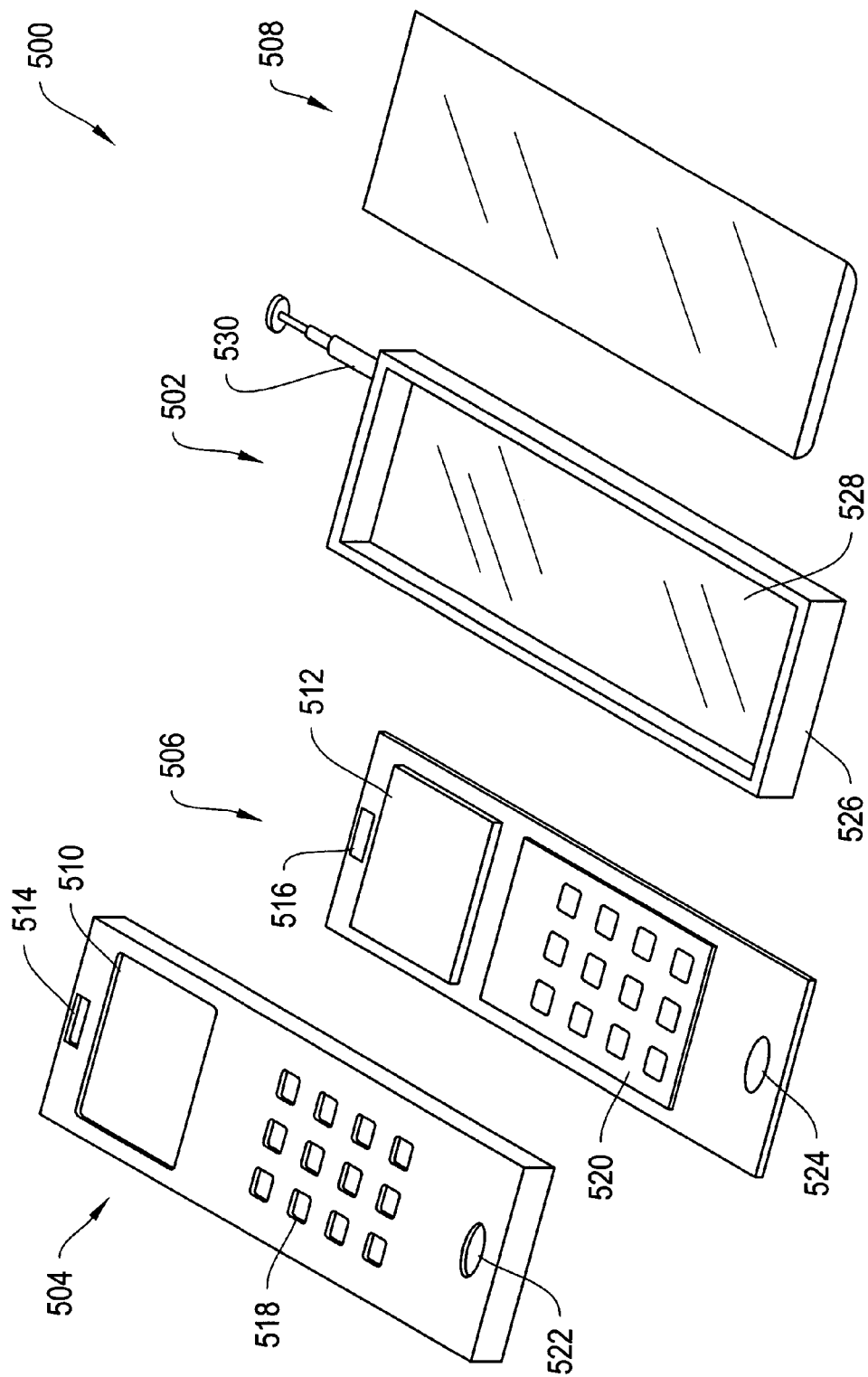
FIG. 5 shows an exploded perspective view of the various sections of a conventional cellular telephone including a frame.

FIG. 5 shows an exploded perspective view of the various sections of a conventional cellular telephone 500 including a frame 502. The cellular telephone 500 generally comprises an upper enclosure or housing 504, a printed circuit board 506, the structural frame member 502, and a battery 508. As shown in FIG. 5, there are a number of features formed on the housing 504 that correspond with components located on the printed circuit board 506. For example, disposed on the exterior face of the housing 504 is a display panel aperture 510 that corresponds with a display panel 512 disposed on the printed circuit board 506.

Adjacent to the display panel aperture 510 is an earphone or speaker aperture 514 that corresponds with a speaker component or assembly 516 on the printed circuit board 506. Also disposed on the face of the housing 504 is an array of keypad apertures 518 that corresponds with a tactile keypad component 520 mounted on the printed circuit board 506. A microphone aperture 522 is located adjacent the keypad apertures 518 that corresponds with a microphone component or assembly 524 which is mounted on the printed circuit board 506.

The cellular telephone 500 includes a structural frame 502, that also includes a surrounding sidewall 526 and a web or backplane 528. An antenna receptacle 530 is formed as part of the frame 502 that enables the transfer of radio frequency (RF) communications with the enclosed printed circuit board 506. The sidewall 526 is formed through a die-casting process using material such as magnesium or zinc or alloys of each. The term die-cast typically refers to a structure formed by a process wherein the casting material is melted into a liquid phase and poured into a die-cast mold. The casting material then assumes the shape of the mold upon cooling and solidification.

The backplane 528 typically includes a thin, high strength formed structure, such as a plate of stainless steel. A formed structure typically includes components that have been stamped, pressed, punched, rolled or otherwise fabricated while the formed material is in a solid phase. The thin plate or backplane 528 is typically secured to the sidewall 526 using a mechanical or die-casting technique.

The backplane 528 typically extends between the surrounding sidewall 526 and divides the enclosed interior space into a printed circuit board compartment and a battery compartment. The printed circuit board compartment is typically bounded on the top by the housing 504, and on the bottom by the backplane 528. The printed circuit board compartment typically contains the printed circuit board 506 and various associated electrical components. The backplane 528 also acts as an upper boundary for the battery compartment. The battery pack 508 can be attached to the frame 502 and forms the back of the cellular telephone 500. It should be understood that the frame 528 typically establishes front and back compartments on each side of the backplane 528.

Figure 6:
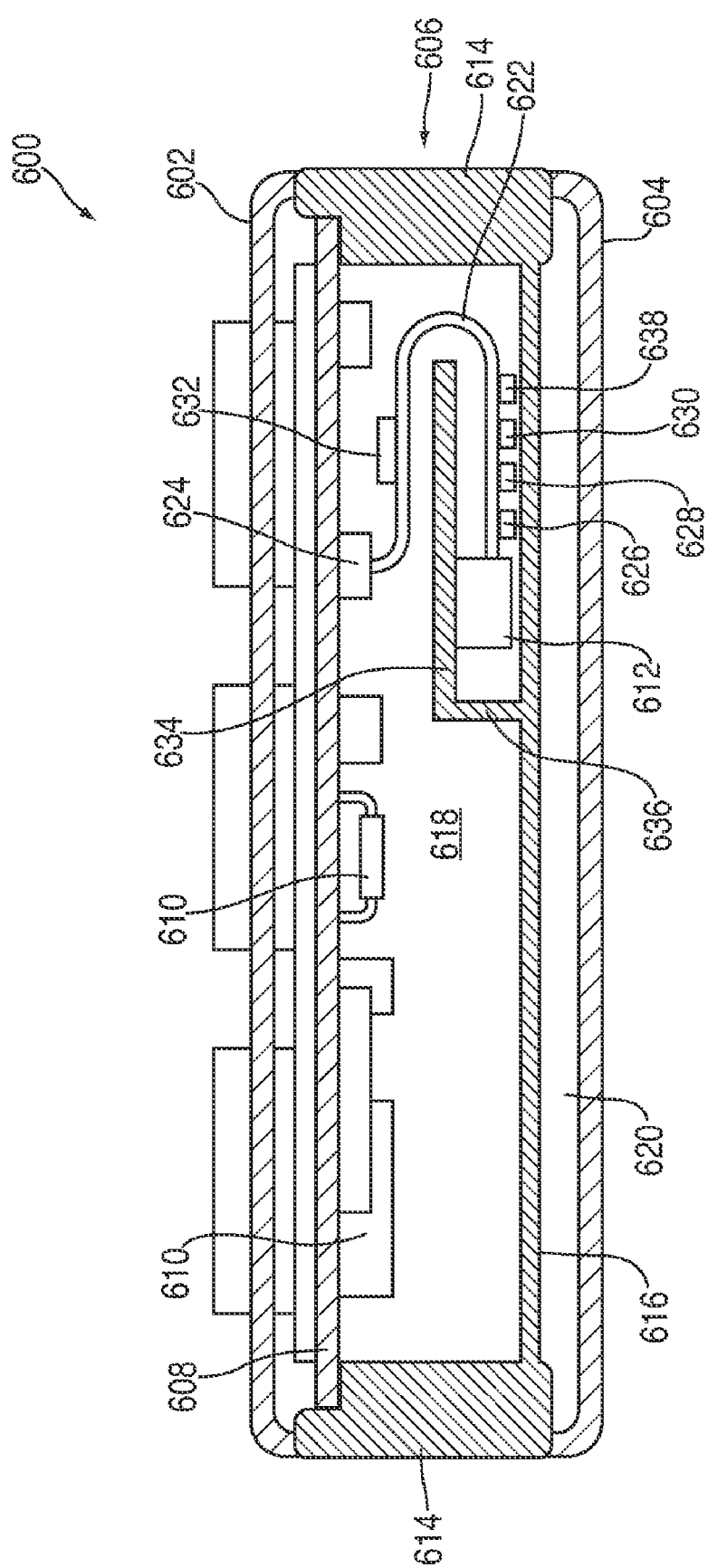
FIG. 6 shows a transverse sectional view of a media device including a flexible circuit according to an illustrative embodiment of the invention.

FIG. 6 shows a transverse sectional view of a media device 600 including a flexible circuit 622 according to an illustrative embodiment of the invention. The media device 600 comprises an upper housing 602, lower housing 604, a frame 606, a printed circuit board 608, printed circuit board components 610, and an acoustic source 612, a printed circuit board cavity 618, a second cavity 620, a flexible circuit 622, a flexible circuit connector 624, a proximity sensor emitter 626, a proximity sensor receiver 628, an light emitting diode (LED) 630, an ambient light sensor 638, a driver circuit 632, a support panel 634, and a support panel arm 636. In one embodiment, the proximity sensor emitter and receiver 626 and 628 are infra-red (IR) based emitter and receivers. The driver circuit 632 may provide driving and/or interfacing circuitry for at least one of the acoustic source 612, proximity sensor emitter 626, proximity sensor receiver 628, ambient light sensor 638, light emitting diode (LED) 630, and any other component, such as a microphone, mounted to the flexible circuit 622.

The frame 606 may include a sidewall or sidewalls 614 and a backplane 616. In one embodiment, the main structural frame 606 is secured to at least one of the upper housing 602 and lower housing 604. At least a portion of the housings 602 and 604 may be fabricated from a die-castable material using a process including die-casting, molding, injection-type molding, and/or the like. In certain embodiments, the support panel 634 includes at least one arm 636, both of which are made of a metal such as, without limitation, steel or a steel alloy. In another embodiment, the at least one arm 636 may be configured to snap into a complementary feature of the frame 606 to provide attachment to the frame 606.

In one embodiment, the frame 606 includes a surrounding sidewall 614 or plurality of sidewalls 614 and a web or backplane 616. The web 616 extends between the sidewall 614 or between two or more sidewalls 614 to form a printed circuit board compartment 618 between the upper housing 602 and the web 616. Thus, the printed circuit board compartment 618 may be bounded on the top by the upper housing 602 and on the bottom by the web 616. In certain embodiments, the sidewall 614 extends completely along the perimeter of the frame 606. Alternatively, the sidewall 614 extends along one or more portions of the perimeter of frame 606, effectively forming a plurality of sidewalls 614. In one embodiment, the frame 606 does not have a sidewall 614, but is connected to or integrated with at least one of the upper housing 602 and the lower housing 604 or integrated with at least one of the first housing portion 104 and the second housing portion 106 of the media device 100.

In certain embodiments, the web 616 and lower housing 604 form a second compartment 620 that contains a battery and/or electrical components. The media device 600 may employ a unitized or composite frame 606 that includes a die-castable material, such as magnesium or zinc, where the sidewalls 614 and the web 616 are constructed of the same or different materials via a die-cast and/or assembly fabrication technique. The frame may also include steel, stainless steel, an alloy of steel, or any like metal. The assembly fabrication technique may include connecting one or more portions of the frame 606 together using glue, one or more mechanical connectors, or another like attachment mechanism or medium.

In certain embodiments, the flexible circuit 622 includes circuit traces that run from the connector 624 to one or more components, such as acoustic source 612 and provide an electrical connection between the components mounted to the flexible circuit 622 and components of the circuit board 608. The circuit board 608 may include one or more of the components shown in FIG. 3 such as the processor 302 or CODEC 312.

In one embodiment, the flexible circuit 622 folds around the support 634 to form a flex assembly including the flexible circuit 622, support panel 634, and at least one of the proximity sensor emitter 626, proximity sensor receiver 628, light emitting diode (LED) 630, driver circuit 632, or any other circuit mounted to the flexible circuit 622. In one embodiment, the flexible circuit 622 includes a polymer-based and/or plastic material. In another embodiment, the flexible circuit can flexibly move or pivot about at least one location of its structure. In a further embodiment, the flexible circuit 622 is folded such that a first portion is adjacent to and/or in contact with a first or top surface of the support panel 634. In yet a further embodiment, the flexible circuit 622 is folded such that a second portion is adjacent to and/or in contact with a second or bottom surface of the support panel 634. At least one component mounted to the flexible circuit 622 may also be in physical communication or integrated with the support panel 634 and/or the frame 606. The flexible circuit 622 may also be integrated with the support panel 634 and/or frame 606.

In certain embodiments, the acoustic source 612, e.g., a speaker assembly, is also integrated with the frame 606 and/or with the support panel 634 as shown in FIG. 6. The acoustic source 612 may include an acoustic assembly which may have, for example, a speaker subassembly including a diaphragm and other speaker components. By integrating the acoustic source 612 with the support panel 634 and/or the frame 606, either or both the support panel 634 and the frame 606 advantageously protect the acoustic source 612 and its components from external forces and/or mitigate the effects of vibration or other interference. The support panel 634 and/or frame 606 may provide like support for any components integrated with the flexible circuit 622. Thus, in certain embodiments, the support panel 634 provides enhanced structural rigidity and support to flexible circuit 622 and/or one or more of the components that are integrated with the flexible circuit 622.

The frame 606 may include one or more apertures, cutouts, openings, and/or recesses to provide support for the flexible circuit 622 and/or any other component integrated with the flexible circuit 622. In one embodiment, the sidewall 614 includes at least one aperture to enable the transport of sound from the acoustic source 612 to outside of the media device 600.

Figure 7:
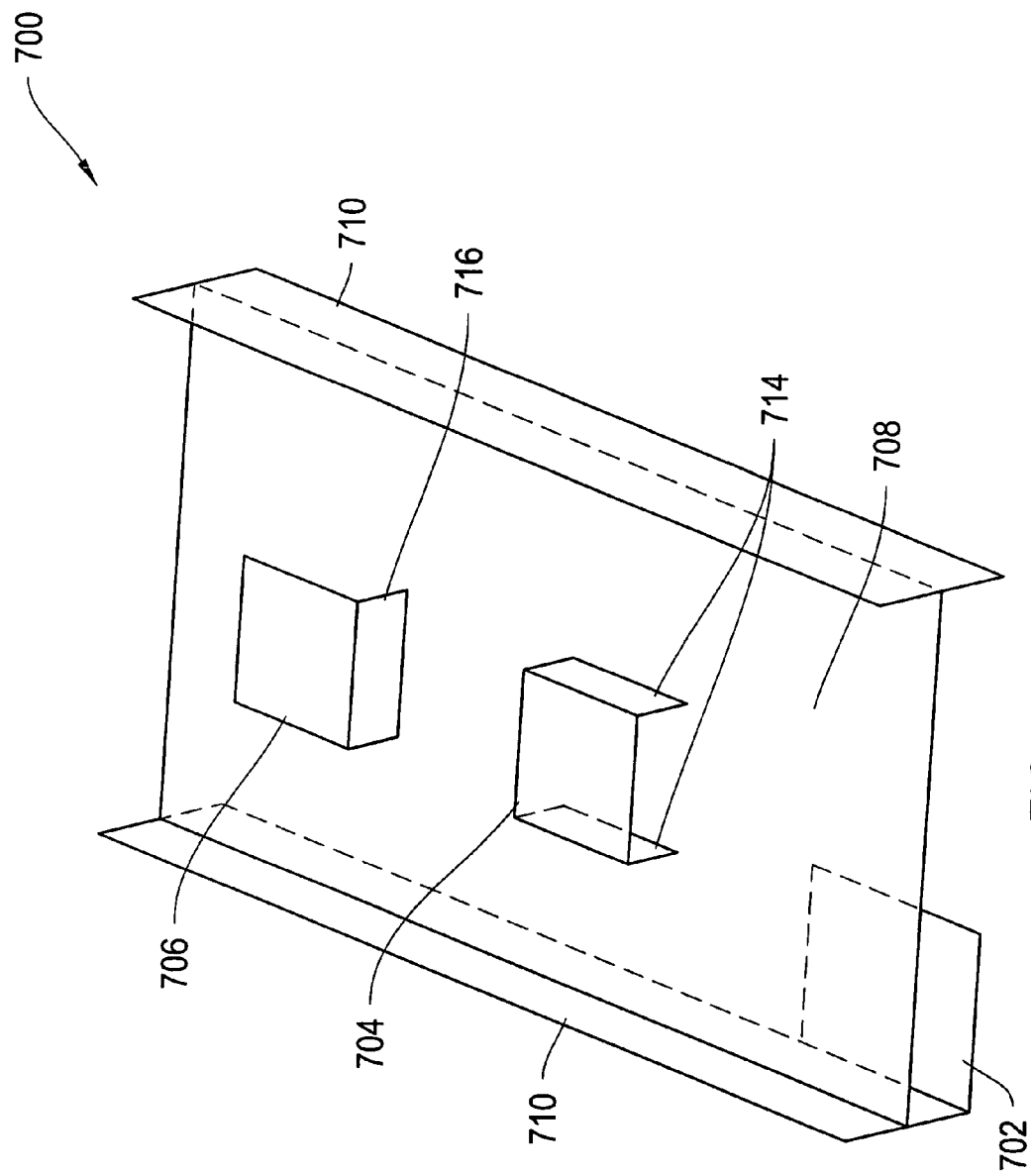
FIG. 7 shows a perspective view of a frame including a support panel according to an illustrative embodiment of the invention.

FIG. 7 shows a perspective view of a frame 700 including support panels 702, 704, and 706 according to an illustrative embodiment of the invention. The frame 700 includes a backplane 708 that extends between sidewalls 710. Although shown as a solid sheet or plane of material, the backplane 708 may include one or more openings, cut-outs, or voids. In one embodiment, the frame 700 includes only sidewall 710 with substantially no backplane 708. In another embodiment, the backplane 708 includes sections or portions that are stepped or shifted vertically from one another. In yet another embodiment, the frame 700 includes a plurality of backplanes 708 or has portions wherein a plurality of backplane sheets overlap or are positioned in parallel with one another.

For example, in one embodiment, a backplane section acts as a support panel 702 that overlaps and/or is positioned substantially in parallel with the backplane 708, both of which are portions of the frame 700. The support panel 702 may also provide support for a flexible circuit such as flexible circuit 622 of FIG. 6. In another embodiment, the support panel 704 may include arms 714 that are attached to the frame 700. The support panel 704 may provide support for and be integrated with a flexible circuit. The arms 714 may be formed by folding portion of the support panel 702 such that the arms extend orthogonally from the plane of the support panel 702. The arms 714 may be attached to the frame 700 using at least one of a mechanical connection, an adhesive, welding, or other attachment means. In yet another embodiment, the support panel 706 may include an arm 716. The support panel 706 may be integrated with and/or support a flexible circuit and/or any related components. In a further embodiment, a multilayered frame 700 provides increased firmness and structural integrity for a media device and its various components.

FIGS. 8A-8C show a perspective views of support panels 800, 802, and 804 for a flexible circuit according to an illustrative embodiment of the invention. The support panel 800 includes arms 806 and 808. The support panel 802 includes arms 810 and 820. The support panel 804 includes arms 822 and 824. Each of the type of arms 806, 810, and 822 may be configured to enable mechanical attachment of the support panels 800, 802, and 804 respectively to a frame, housing, flexible circuit, and/or other structure within a media device. The support panels 800, 802, and/or 804 may include a metal such as, without limitation, steel. The support panels may be formed by machining, cutting, rolling, punching, stamping, and/or any like metal working process.

FIG. 9 shows a transverse view of a flex assembly 900 including flexible circuit 902 according to an illustrative embodiment of the invention. The flex assembly 900 includes a connector 904, components 906, an LED 908, a temporary support panel 910, driver circuits 912, acoustic source mounting section 914, and an extension section 916. In one embodiment, the connector 904 provides a mechanical connection of the flex assembly 900 to a circuit board such as circuit board 608 of FIG. 6. The connector 904 also enables an electrical connection from the circuit board 608 to the components 906, LED 908, and an acoustic source that will be mounted to the mounting section 914.

The extension section 916 of the flexible circuit 902 may assume any one of a variety of shapes to enable flexible positioning of, for example, the components 906 at any desired location within a media device housing. For example, without limitation, the extension section may be short, elongated, curved, stepped, folded, multi-folded, multi-stepped, or configured as required to position one or more of the components 906 in a desired position within a media device housing. In one embodiment, the temporary support panel 910 includes at least one of a polymer and a metal to provide support for the flexible circuit 902 prior to installation within a media device, prior to integration with a frame, or during pre-assembly transport. In one embodiment, the temporary support panel 910 is replaced with a permanent support such as support panel 800 of FIG. 8A. The components 906 may include a proximity sensor emitter 626, a proximity sensor receiver 628, an ambient light sensor 630, a LED 638, and any other component mounted to the flexible circuit 902.

FIG. 10 shows a transverse view of a flex assembly 1000 including a flexible circuit 1002 having support panels 1004, 1006, and 1008 according to an illustrative embodiment of the invention. The flex assembly 1000 includes a connector 1010, components 1012, an LED 1014, driver circuits 1016, acoustic source mounting section 1018, and an extension section 1020. In one embodiment, the various elements of the flex assembly 1000 function in a similar manner as the elements described with respect to FIG. 9.

In one embodiment, the support panel 1004 is the same as support panel 804 of FIG. 8C, the support panel 1006 is the same as support panel 802 of FIG. 8, and the support panel 1008 is the same as support panel 800 of FIG. 8. In another embodiment, the flexible circuit 1002 is folded at location 1022 such that a first portion 1024 is adjacent to a first surface of the support panel 1008 and a second portion 1026 is adjacent to a second surface of the support panel 1008. By folding the flexible circuit 1002 around the support panel 1008, the support panel 1008 provides rigid support for the flexible circuit 1002 and the components mounted to the circuit 1002. Also, by mounting multiple elements such as components 1012 on the first portion 1024 and driver circuits 1016 on the second portion 1026, the flexible circuit 1002 provides a compact, yet rigid, structure that is capable of withstanding various physical stresses.

FIG. 11 shows a top down view of a flex assembly 1100 including a flexible circuit 1102 according to an illustrative embodiment of the invention. The flex assembly 1100 includes a connector 1104, a connector support panel 1106, components 1108, an LED 1110, driver circuits (not shown), acoustic source mounting section 1112, and an extension section 1114. The mounting section 1112 may include one or more contact pads that provide for mounting of an acoustic source. In one embodiment, the connector 1104 provides a mechanical connection of the flex assembly 1100 to a circuit board such as circuit board 608 of FIG. 6. The connector 1104 also enables an electrical connection from the circuit board 608 to the components 1108, LED 1110, and an acoustic source that is mounted to the mounting section 1112.

The components 1108 may include a proximity sensor emitter 1118, a proximity sensor receiver 1120, an ambient light sensor 1122, the LED 1110, and any other component mounted to the flexible circuit 1102. The extension section 1114 of the flexible circuit 1102 may assume any one of a variety of shapes to enable flexible positioning of, for example, the components 1108 at any desired location within a media device housing. In one embodiment, the connector support panel 1106 provides structural support for the connector 1104.

FIG. 12 shows a top down view of a flex assembly 1200 including a flexible circuit 1102 having support panels 1204, 1206, and 1208 according to an illustrative embodiment of the invention. As described with respect to FIGS. 8 and 10, the support panels 1204, 1206, and 1208 provide structural support at various portions of the flexible circuit 1202 and provide support for various components that may be integrated with the flexible circuit 1202.

Figure 13:
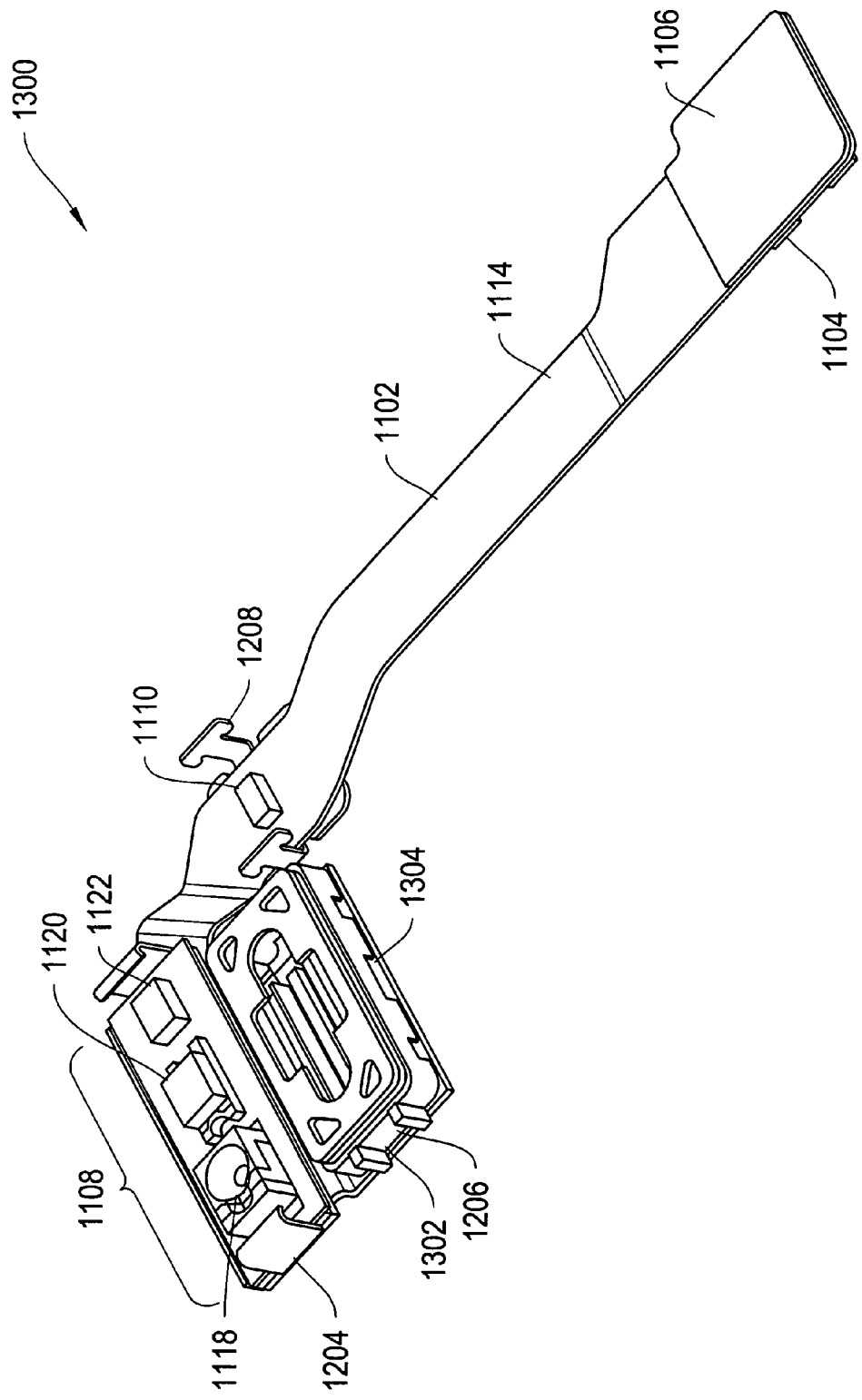
FIG. 13 shows a perspective view of a flex assembly including the components shown in FIGS. 11 and 12 along with an acoustic source according to an illustrative embodiment of the invention.

FIG. 13 shows a perspective view of a flex assembly 1300 including the components shown in FIGS. 11 and 12 along with an acoustic source 1302 according to an illustrative embodiment of the invention. In one embodiment, the acoustic source 1302 includes an acoustic assembly 1304 having components such as at least one of a transducer, a diaphragm, and electrical components.

Figure 14:
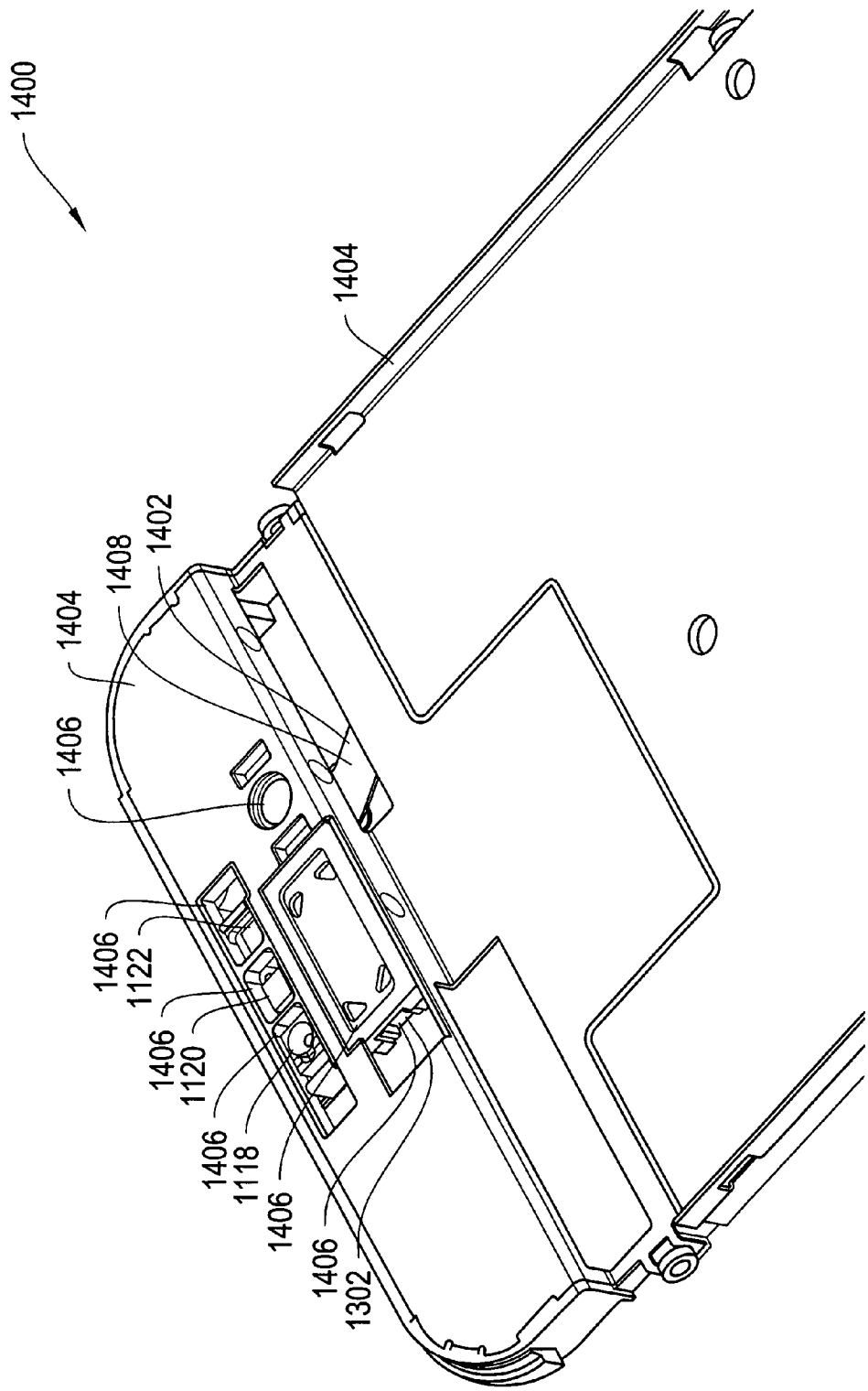
FIG. 14 shows a perspective view of a flex assembly integrated with a frame according to an illustrative embodiment of the invention.

FIG. 14 shows a perspective view of a flex assembly 1402 integrated with a frame 1404 in a media device 1400 according to an illustrative embodiment of the invention. In one embodiment, the frame 1404 includes one or more openings and/or recesses 1406 associated with one or more components that are integrated with the flexible circuit 1408. For example, the frame 1404 includes openings 1406 for proximity sensor emitter 1118, proximity sensor receiver 1120, ambient light sensor 1122, LED 1110 (not shown), and the acoustic source 1302. In one embodiment, the flex assembly 1402 and/or one or more of its elements are integrated with the frame 1404 to provide enhanced structural support to the flex assembly 1402 and its elements.

Figure 15:
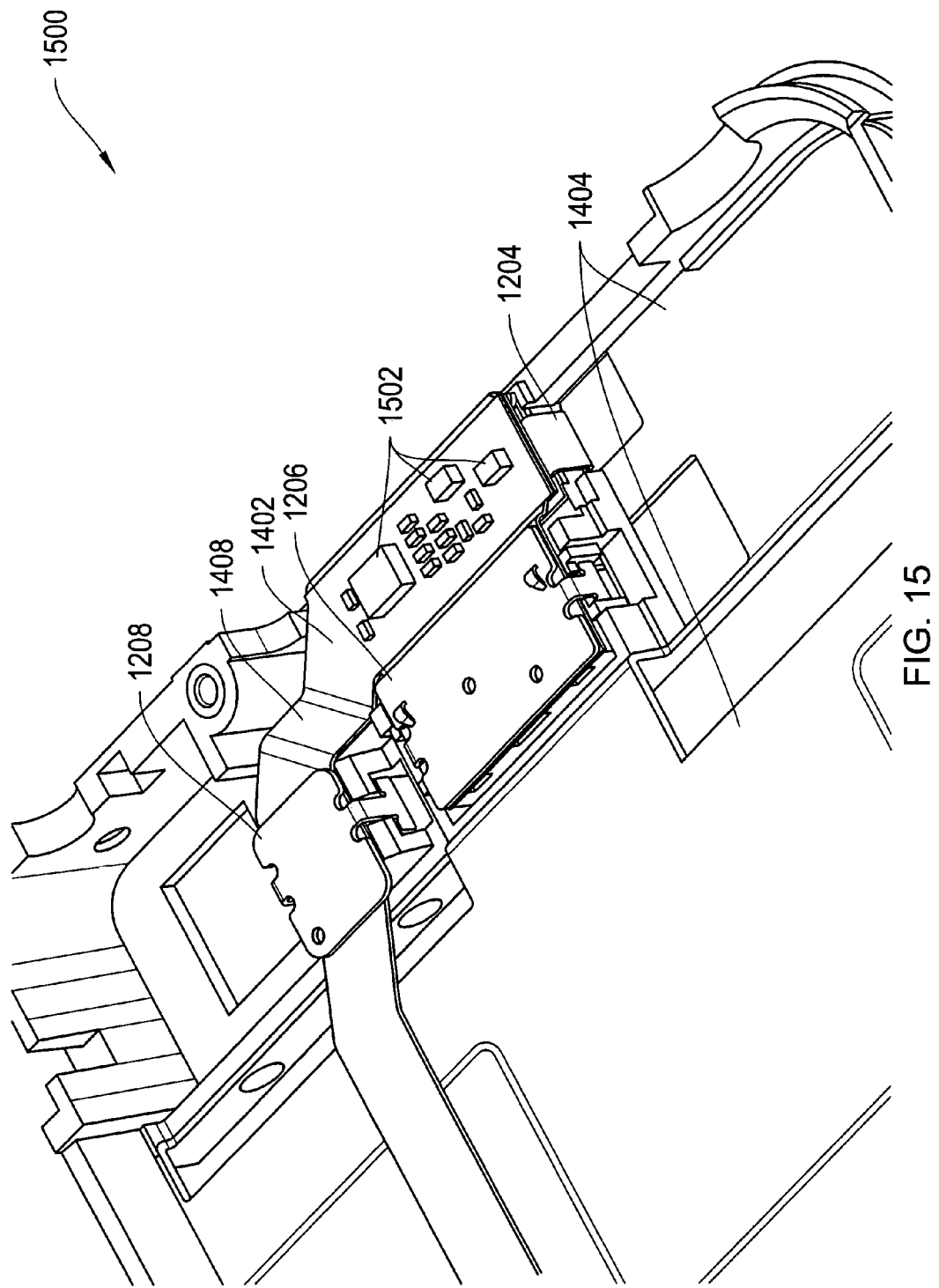
FIG. 15 shows another perspective view of a flex assembly integrated with a frame according to an illustrative embodiment of the invention.

FIG. 15 shows another perspective view of a flex assembly 1402 integrated with the frame 1404 of a media device 1500 according to an illustrative embodiment of the invention. With respect to FIG. 14, FIG. 15 shows the bottom or second side of the frame 1404. Thus, FIG. 15 shows the driver integrated circuits 1502 mounted to the flexible circuit 1408. With respect to FIG. 14, the driver circuits 1502 are below the components 1118, 1120 and 1122 that are mounted to a folded section of the flexible circuit 1408. In one embodiment, a folded portion of the flexible circuit 1408 surrounds the support panel 1204 which provides support to the driver circuits 1502 and components 1118, 1120, and 1122. In another embodiment, the support panel 1206 provides support for the flexible circuit 1408 and the acoustic source 1302. In a further embodiment, the support panel 1208 provides support for the flexible circuit 1408 and the LED 1110 shown in FIG. 11. In certain embodiments, at least one of the support panels 1204, 1206, and 1208 are integrated with the frame 1404.

Figure 16:
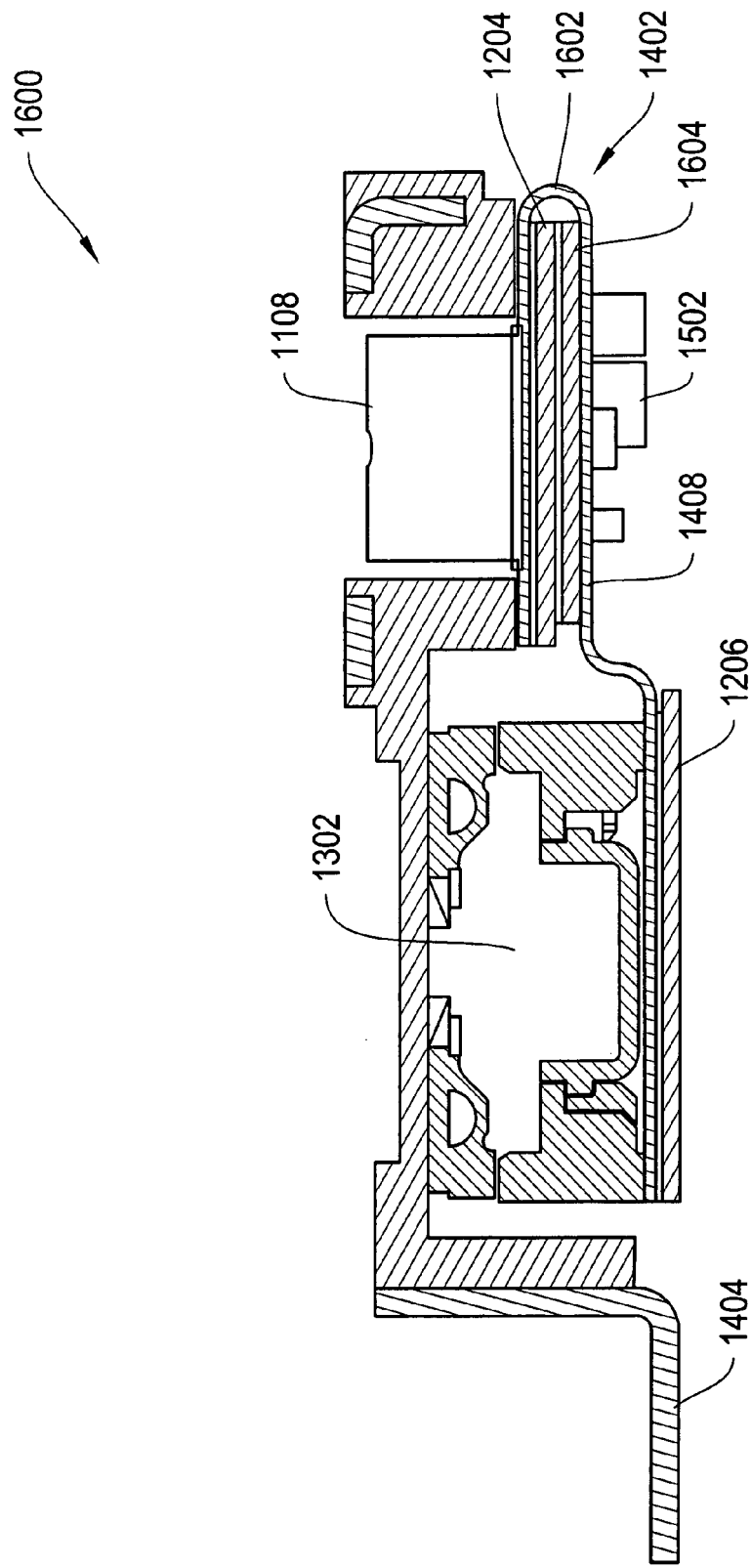
FIG. 16 shows a transverse sectional view of a flex assembly integrated with a frame according to an illustrative embodiment of the invention.

FIG. 16 shows a sectional view of a portion of the flex assembly 1402 integrated with a frame 1404 of a media device 1600 according to an illustrative embodiment of the invention. In one embodiment, at least one additional layer 1604 is integrated with at least one of the support panel 1204 and the flexible circuit 1408 to provide additional support and/or to adjust the bend radius of the fold of the flexible circuit 1408 at location 1602.

Figure 17:
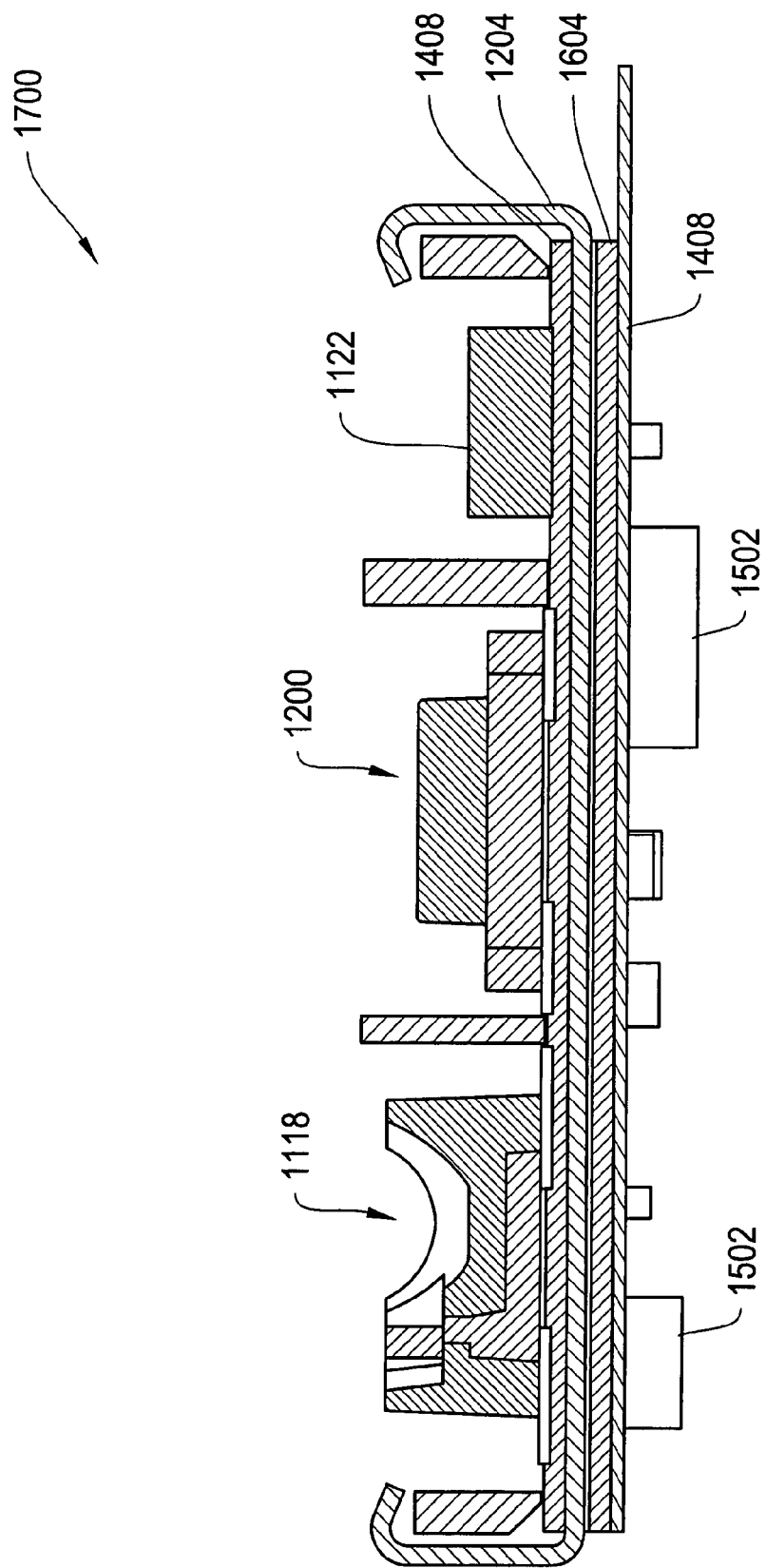
FIG. 17 shows another transverse sectional view of a flex assembly integrated with a frame according to an illustrative embodiment of the invention.

FIG. 17 shows another transverse sectional view of the flex assembly 1402 integrated with the frame 1404 according to an illustrative embodiment of the invention. FIG. 17 provide another illustration wherein the support panel 1204 is positioned between a first and second portion of the flexible circuit 1408.

FIG. 18 is a flow chart of a process 1800 for manufacturing a media device according to an illustrative embodiment of the invention. The process 1800, in one embodiment, includes providing a media device housing such as housing 102 of FIG. 1 (Step 1802). Then, attaching a frame such as frame 700 to the housing (Step 1804). Also, a support panel such as support panel 1204 is integrated with the frame (Step 1806). Then, a flexible circuit such as flexible circuit 1408 is folded adjacent to the support panel to provide enhanced support for the flexible circuit (Step 1808).

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. A media device comprising:
   a housing,
   a frame disposed adjacent to the housing,
   a support component comprising:
      a support arm coupled to the frame; and
      a support panel coupled to the support arm, wherein the support panel and the support arm are coupled such that the support panel is displaced from the frame, and
   a flexible circuit disposed adjacent to the support panel to provide support for the flexible circuit, wherein the flexible circuit includes:
      a first portion;
      a second portion; and
      a fold located between the first portion and the second portion such that the first portion and the second portion of the flexible circuit fold around at least a portion of the support panel.

2. The device of claim 1, wherein integrated with includes detachably connected to.

3. The device of claim 1, wherein integrated with includes unitarily formed with.

4. The device of claim 1, wherein integrated with includes mounted to.

5. The device of claim 1, wherein the frame is disposed substantially within the housing.

6. The device of claim 1, wherein the frame includes a backplane.

7. The device of claim 1, wherein the first portion is adjacent to a first surface of the support panel.

8. The device of claim 7, wherein the second portion is adjacent to a second surface of the support panel.

9. The device of claim 1, wherein the flexible circuit further includes at least one of an acoustic source, a microphone, a proximity sensor, a light sensor, and a light source.

10. The device of claim 1, wherein the first portion is positioned between at least a portion of a bottom surface of the support panel and at least a portion of the frame and the second portion is positioned above at least a portion of a top surface of the support panel.

11. The device of claim 1, wherein the support panel is substantially parallel to the frame.

12. A method for emitting a sound from a media device comprising:

integrating a support panel with a frame of the media device, wherein the support panel comprises a bottom surface and a top surface, positioning a portion of a flexible circuit adjacent to the support panel, wherein the flexible circuit includes a fold such that a first portion of the flexible circuit is positioned between at least a portion of the bottom surface of the support panel and at least a portion of the frame and a second portion of the flexible circuit is positioned above at least a portion of the top surface of the support panel, integrating an acoustic source with the flexible circuit, and emitting sound from the acoustic source to an external aperture of the media device.

13. The method of claim 12, wherein integrating includes detachably connecting to.

14. The method of claim 12, wherein integrating includes unitarily forming with.

15. The method of claim 12, wherein integrating includes mounting to.

16. The method of claim 12, wherein the frame is disposed substantially within the housing.

17. The method of claim 12, wherein the first portion is adjacent to the bottom surface of the support panel.

18. The method of claim 12, wherein the second portion is adjacent to the top surface of the support panel.

19. The method of claim 12, wherein the fold is between the first and second portion for folding the first and second portion of the flexible circuit around at least a portion of the support panel.

20. The method of claim 12, wherein the flexible circuit further includes at least one of a microphone, a proximity sensor, a light sensor, and a light source.

21. The method of claim 12, wherein the support panel further comprises a support arm coupling the support panel to the frame such that the bottom and top surface of the support panel are displaced from the frame.

22. The method of claim 12, where positioning a portion comprises:

positioning a first portion of the support panel between the frame and a bottom surface of the support panel; and positioning a second portion of the support panel above a top surface of the support panel, and wherein the fold couples the first portion to the second portion.

23. A method for manufacturing a media device comprising:

providing a housing, attaching a frame to the housing, coupling a support arm to the frame, coupling a support panel to the support arm, wherein the support arm displaces the support panel from the frame, and positioning a portion of a flexible circuit adjacent to the support panel, wherein the flexible circuit includes a fold such that the flexible circuit is folded around at least a portion of the support panel.

24. The method of claim 23, wherein positioning a portion includes positioning a first portion of the flexible circuit adjacent to a first surface of the support panel.

25. The method of claim 24, wherein positioning a portion further includes positioning a second portion of the flexible circuit adjacent to a second surface of the support panel.

26. The method of claim 25, wherein positioning a portion further includes folding the first and second portions such that the first and second portions of the flexible circuit surround at least a portion of the support panel.

* * * * *

UNITED STATES PATENT AND TRADEMARK OFFICE
CERTIFICATE OF CORRECTION

PATENT NO. : 7,756,553 B2 Page 1 of 1
APPLICATION NO. : 11/650923
DATED : July 13, 2010
INVENTOR(S) : Dinh et al.

It is certified that error appears in the above-identified patent and that said Letters Patent is hereby corrected as shown below:

On the Cover Page, bracket (75), under "Inventors:", correct the fourth named inventor's name from "Philip Michael Hobson" to --Phillip Michael Hobson--.

Signed and Sealed this

Sixteenth Day of November, 2010

David J. Kappos
*Director of the United States Patent and Trademark Office*